Patented July 31, 1928.

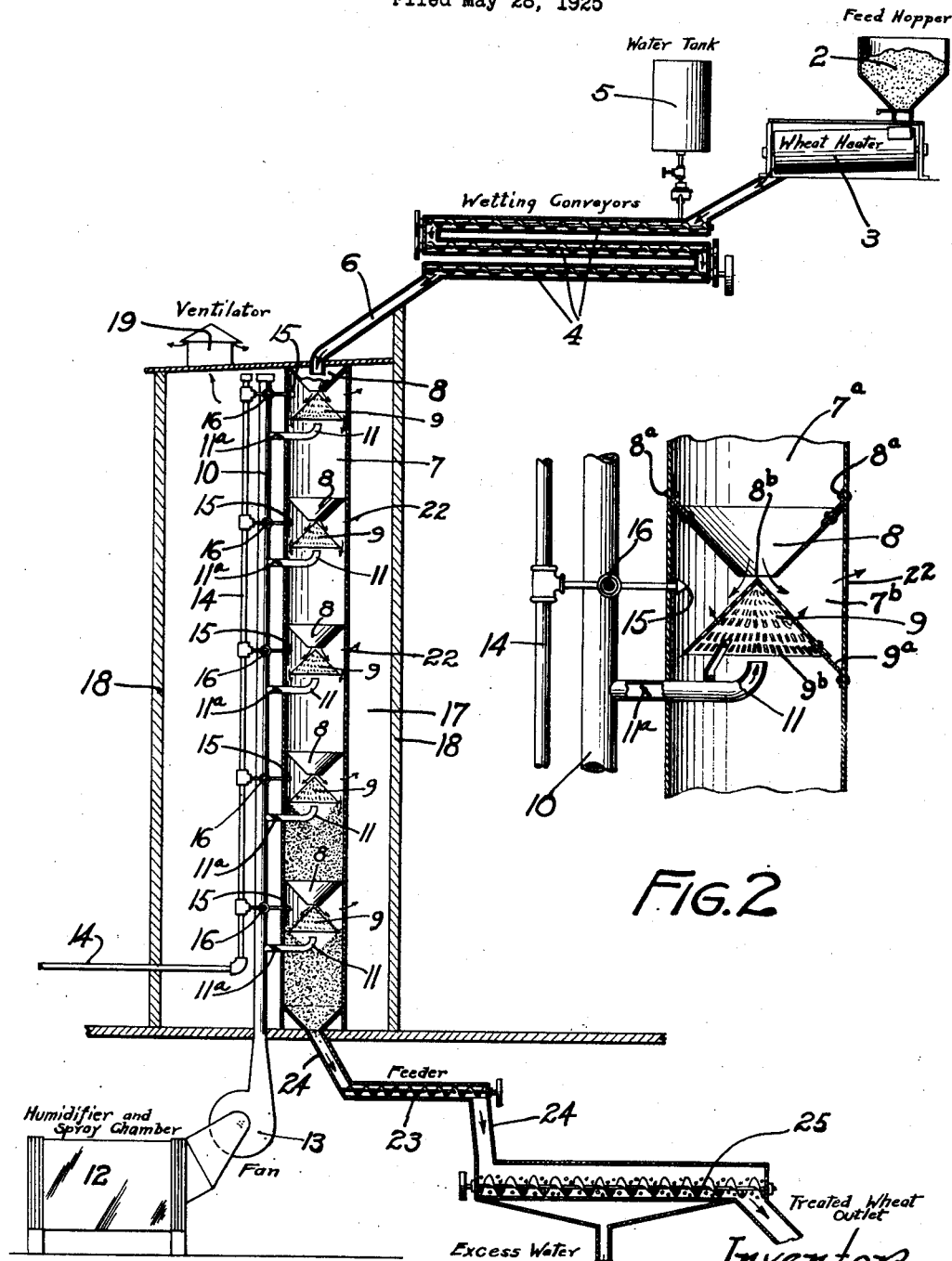

1,679,099

UNITED STATES PATENT OFFICE.

LOUIS E. SMITH, OF MINNEAPOLIS, MINNESOTA, ASSIGNOR TO INTERNATIONAL MILLING COMPANY, OF MINNEAPOLIS, MINNESOTA, A CORPORATION OF DELAWARE.

METHOD OF AND APPARATUS FOR TREATING WHEAT.

Application filed May 28, 1925. Serial No. 33,475.

It is commonly known that after wheat is harvested a chemical change takes place in the wheat berry which improves the quality of the flour which is afterwards produced therefrom. There is a very marked difference between flour made from old wheat and flour made from wheat newly harvested. The length of time which, under normal conditions, is necessary to produce this change in the wheat varies from a week or two to several months and is brought about by the action of the air, rain, and general exposure to the elements while the wheat is in shock, or in stack, or in the bin.

This change which, under natural conditions, requires a varying amount of time and occurs in a varying degree I bring about artificially in a predetermined time and uniformly throughout the whole mass of wheat.

The nature of the change that is brought about in the wheat berry consists in increased acidity and increased volume of soluble carbohydrates with a decrease in the starch and in the dry gluten contents. The effect of this change in the wheat is to improve the baking quality of the flour produced therefrom whereby it is more readily subject to the action of yeast, producing increased loaf volume and general improvement in the appearance and edibility of the bread.

The invention consists generally in the process hereinafter described and claimed and in the apparatus disclosed herein by means of which this process may be carried out.

In the accompanying drawings forming part of this specification;

Figure 1 is a vertical section of an apparatus that may be used for carrying out my newly invented process; and Figure 2 is an enlarged detail sectional view of one of the receiving cones or hoppers and its complementary distributing cone.

In the drawing 2 represents an automatic feeding device through which the wheat passes at a regular predetermined rate so that a uniform quantity of wheat will pass through the treating apparatus in any given unit of time. From this feeder the wheat is fed to a wheat heater 3 where it is heated to the desired temperature. From the heater the wheat passes to a wetting conveyer 4 which is preferably of the screw-conveyor type and may be made of any desired length so as to keep the wheat in contact with the water for any desired length of time.

I have here shown a triple spiral conveyer, the wheat passing through all of the sections thereof before it is discharged to the treating tanks hereinafter described.

I prefer to provide a tank 5 adapted to contain warm water which is supplied to the wetting conveyers as desired. I prefer to have a liberal stream of warm water running onto the wheat while the wheat is passing therethrough, the water being changed at such a rate as may be found desirable.

The wetting conveyer 4 preferably discharges through a conductor 6 into a tank 7 preferably constructed of metal and of cylindrical form and of such diameter and length as may be desired. This tank is divided into a series of compartments $7^a$ by a corresponding series of receiving cones or hoppers 8 and reversely arranged distributing cones 9. The hoppers 8 are preferably secured to the wall of the tank by suitable clips $8^a$, preferably riveted to the hoppers and to the tank wall (Figure 2). These hoppers are of such size as to fill the space within the wall of the tank thereby making a substantially grain-tight joint between the edge of the hopper and the wall of the tank. The hoppers are preferably provided at their lower ends with central discharge openings $8^b$.

The distributing cones 9 are arranged in an inverted position, the apex of each cone being arranged preferably substantially central of the discharge opening of the hopper 8 (Figure 2). These cones are of less diameter than the hopper 8, so that a narrow space is left between the base of the cone and the wall of the tank, and said cones are secured in position by suitable clips $9^a$ preferably riveted to the wall of the tank and to the lower part of the cone (see Figure 2).

The cones 9 are preferably formed of perforated metal, the perforations being usually in the form of slits $\frac{1}{16}''$ by $\frac{3}{8}''$ (as indicated at $9^b$ in Figure 2) to allow air to pass through the grain. An annular space is thus formed between the lower surface of the hopper 8 and the upper surface of the cone 9, which space will ordinarily be substantially free from grain, although all of the compartments $7^a$ of the tank are substantially filled with grain to the height of the distributing cone 9 as indicated in Figure 1, the weight of the grain in each compartment being substantially supported by the hopper 8. The grain that flows through the central opening in the hopper being spread out in a thin sheet upon the outwardly flaring surface of the cone 9 and passing downward between the base of the cone and the wall of the tank.

For the purpose of evenly moistening and conditioning the grain at intervals throughout the height of the tank and as it passes through the space between the lower end of one compartment 7ª and the top of the next compartment, I preferably provide an air pipe 10 extending substantially the full height of the tank and having a series of discharge pipes 11 projecting therefrom through the wall of the tank and having open up-turned ends below the deflecting cones 9. The pipes 11 are preferably provided with regulating valves 11ª outside of the wall of the tank 7 (Figure 2). These pipes discharge currents of air upward within the distributing cone 9 and this air passes through the openings 9ᵇ in the distributing cones 9 and is brought into contact with the grain passing in a thin sheet downward over the distributing cone 9. The air that is supplied to the discharge pipes 10 may, if preferred, be first brought through a suitable humidifier and spray chamber 12, which may be of any preferred construction and in which the air may, if preferred, be passed in contact with suitable steam coils or other heating devices and over a suitable water supply whereby the air may be moistened to any suitable degree before it is brought in contact with the grain. A fan 13 may be provided to draw the air through the humidifier and to force it into the grain treating tank at intervals, as illustrated.

Also to increase, if necessary, the amount of water brought into contact with the grain, I preferably provide a water pipe 14 extending upward outside of the wall of the tank 7. This pipe is provided with a series of nozzles 15 which extend through the walls of the tank, being located preferably substantially on a level with the discharge openings of the cones 18.

It will be seen that the spaces within the tank between the opposing faces of the cones 8 and 9 will be at all times substantially free from grain except for the thin sheet that is passing downward over the outer surface of the lower cone, and the nozzles 15 are so located that all of the grain passing out of the opening in the upper cone may be subjected directly to the jet of water entering this space. Each of the nozzles 15 may be provided with a suitable valve 16 for the purpose of regulating the discharge of water through the nozzles.

The tank 7 is preferably located within a chamber 17 which may be of any desired size. The enclosing wall 18 of this chamber is preferably of substantially the same height as the tank 7 and the chamber is provided with suitable ventilators 19 through which air may escape therefrom. Vent holes 22 are provided in the wall of the tank 7 preferably leading from the space between the opposing surfaces of the cones 8 and 9. A suitable feeder 23 may be located in the discharge pipe 24 leading from the tank 7 thus permitting the grain to pass through said feeder while preventing escape of the air therethrough. A spiral conveyor 25, having a perforated bottom, may be provided beneath the feeder 23 to receive the wheat therefrom for the purpose of draining off any excess water which may be contained in the wheat.

In carrying out this process by the use of the apparatus described, the grain which has been saturated with warm water in the conveyors 14 is introduced into the top of the tank 7, preferably by being led into the upper hopper cone by any suitable means. The tank 7 may be of any desired type and size so as to treat any desired quantity of wheat. As the grain passes through the opening in an upper cone, it spreads out over the conical perforated surface of the inverted cone below. Here it may be subjected to a jet of water through the nozzle 15. At the same time it is subjected to a current of air of any desired temperature, and of any desired degree of moisture, which is forced out of the air pipe 11 into the space beneath the inverted cone 9. The air passing through the thin sheet of wheat, moving over the surface of the cone, passes outward through the openings 22 into the chamber 17 and escapes therefrom through the ventilators 19.

The operation of subjecting the grain as it passes out of the hopper cone onto the surface of the distributor cone below to the jet of water and the current of air, is repeated throughout the full height of the tank. The grain as it passes through the tank is, therefore, completely and evenly subjected to the water and air treatment as it passes from one compartment of the tank to another, and as these compartments may be of any desired height or capacity the grain may be subjected to such treatment as many times as desired in its passage through the tank. As all of the grain is compelled to pass in a thin sheet over each distributing cone it is thereby necessarily evenly subjected to the air and moisture treatment, as it passes from one compartment of the tank to the next compartment below. The grain may be fed through the apparatus at any desired rate of travel determined by the speed at which the feeders above and below the tank are rotated and may be held as long as desired within the tank, care being taken, preferably, to permit the space outside of and between each pair of cones to be free from grain so as not to interfere with the flow of the grain in a thin sheet over the surface of each distributor cone where it is subjected to the moisture from the water jet and to air from the air pipes arranged below the distributor cone. It will be seen that the entire action of the apparatus is under the complete control of the operator. The amount of water and the amount of air brought into contact with the grain at any of the distributing points is under complete control, and, if desired, at any distributing point, the supply of water and air, one or both, may be completely shut off. It will be seen that each air current is independent of every other air current and that each water jet is also independent of every other water jet. This enables me to independently regulate the supply of water and the supply of air in connection with each of the distributors so that I furnish to the grain at the location of each distributor when it is moving in a thin sheet and in a closed chamber an independently regulated current of air, or both an independently regulated current of air and an independently regulated supply of water. This enables me to very perfectly regulate both the supply of water and the supply of air to the grain at each of the distributors and I thus obtain a very complete and even aging effect from the action of the air and water.

I have found that by the use of this process I am able to bring about a chemical change substantially the same as takes place immediately prior to the germination of the wheat berry.

In other words, I age the wheat in a very short time by subjecting it to moisture and heat under proper control in a manner substantially similar to what will naturally be done as the wheat ages in the shock, stack or granary. Instead, however, of having this aging process take place very slowly and irregularly as happens under natural conditions, I am able to subject all portions of the wheat to regulated amounts of heat and moisture, thereby producing, in a comparatively short time, the same chemical changes that occur under natural conditions from exposure of the wheat to weather conditions, and I also treat the wheat uniformly so that the chemical changes that take place from this process are alike throughout the entire body of wheat.

I claim as my invention:

1. The method of treating wheat to increase the acidity and volume of soluble carbohydrates and decrease the starch and dry gluten content, which consists in subjecting the wheat berries while moving in a thin sheet and in a closed chamber to the action of independently regulated currents of moist air.

2. The method of treating wheat to produce chemical changes similar to those produced by natural causes when the wheat ages in the shock, stack or granary, which consists in subjecting the wheat berries while moving in a thin sheet and in a closed chamber to the action of independently regulated currents of moist air.

3. The method of treating wheat to produce chemical changes similar to those produced by natural causes when the wheat ages in the shock, stack or granary, which consists in wetting the wheat berries while moving in a thin sheet and in a closed chamber and simultaneously subjecting the wet berries to independently regulated currents of air.

4. The method of treating wheat to produce chemical changes similar to those produced by natural causes when the wheat ages in the shock, stack or granary, which consists in causing the wheat to pass by gravity successively through a series of compartments in an upright tank, causing the grain to be spread in a thin sheet as it passes from one compartment to another and subjecting the grain while in such thin sheet to the action of independently regulated currents of moist air.

5. The method of treating wheat to produce chemical changes similar to those produced by natural causes when the wheat ages in the shock, stack or granary, which consists in causing the wheat to pass by gravity successively through a series of compartments in an upright tank, wetting the grain and subjecting it to the action of independently regulated currents of air as it passes from one compartment to another.

6. The method of treating wheat to produce chemical changes similar to those produced by natural causes when the wheat ages in the shock, stack or granary, which consists in causing the wheat to pass by gravity successively through a series of compartments in an upright tank, wetting the grain and subjecting it to the action of independently regulated currents of air as it passes from one compartment to another, and regulating the rate of passage of the grain through said tank.

7. The method of treating wheat to produce in a short period of time chemical changes in the composition of the wheat berry similar to those produced in a long period of time by natural causes when the wheat ages in the shock, stack or granary, which consists in subjecting each part of a moving body of wheat to an even and uniform application of independently regulated currents of moist air.

8. The method of treating wheat to produce in a short period of time chemical changes in the composition of the wheat berry similar to those produced in a long period of time by natural causes when the wheat ages in the shock, stack or granary, which consists in subjecting each part of a moving body of wheat to successive, even and uniform applications of independently regulated currents of moist air.

9. The method of treating wheat to produce in a short period of time chemical changes in the composition of the wheat berry similar to those produced in a long period of time by natural causes when the wheat ages in the shock, stack or granary, which consists in evenly wetting the berries in a body of wheat and thereafter subjecting the same to an even and uniform application of independently regulated currents of air.

10. Apparatus for treating grain comprising an upright tank, a series of hopper cones, each having a discharge opening, and arranged at intervals in said tank and dividing the same into compartments, a perforated distributer arranged beneath each hopper cone and over which the grain passes in a thin sheet from said hopper, an air pipe arranged beneath each distributer, and means for forcing air through said pipe and through said distributer and into contact with the passing grain.

11. Apparatus for treating grain comprising an upright tank, a series of hopper cones, each having a discharge opening, and arranged at intervals in said tank and dividing the same into compartments, a perforated conical distributer arranged beneath each hopper cone with its apex below the discharge opening of the upper cone, whereby the grain passes in a thin sheet from said hopper cone over said distributer, an air pipe arranged beneath each distributer and means for forcing air through said pipe and through said distributer and into contact with the passing grain.

12. Apparatus for treating grain comprising an upright tank, a series of hopper cones, each having a discharge opening, and arranged at intervals in said tank and dividing the same into compartments, a perforated conical distributer arranged beneath each hopper cone with its apex below the discharge opening of the cone, whereby the grain passes in a thin sheet from said hopper cone over said distributer, an air pipe arranged beneath each distributer, means for forcing air through said pipe and through said distributer and into contact with the passing grain, and means for discharging water into the space between said hopper cone and said distributer and into contact with the grain passing from said hopper cone to said distributer.

13. Apparatus for treating grain comprising an upright tank, means dividing said tank into a series of compartments and permitting the grain to flow by gravity from one compartment to another, means distributing the grain in a thin sheet as it enters each compartment, and means for subjecting the grain while moving in a thin sheet to currents of evenly distributed and independently regulated currents of moist air.

14. Apparatus for treating grain comprising an upright tank, means dividing said tank into a series of compartments and permitting the grain to flow by gravity from one compartment to another, means for wetting the grain as it enters each compartment and means for thereafter subjecting the grain to independently regulated currents of evenly distributed air.

15. Apparatus for treating grain comprising an upright tank, means dividing said tank into a series of compartments and permitting the grain to flow by gravity from one compartment to another, means for evenly distributing the grain as it enters each compartment and means for wetting the distributed grain and subjecting it to independent currents of evenly distributed air.

16. Apparatus for treating grain comprising an upright tank, means dividing said tank into a series of compartments and permitting the grain to flow by gravity from one compartment to another, means for evenly distributing the grain as it enters each compartment, means for wetting the distributed grain and subjecting it to independent currents of evenly distributed air, and means for preliminarily heating and wetting the grain before it enters said tank.

In witness whereof, I have hereunto set my hand this 25th day of May, 1925.

LOUIS E. SMITH.